United States Patent
Hu et al.

(10) Patent No.: US 10,556,219 B2
(45) Date of Patent: Feb. 11, 2020

(54) CONTINUOUS CHEMICAL REACTOR

(71) Applicant: ZHENGZHOU GAOFU FERTILIZER CO., LTD, Henan (CN)

(72) Inventors: Jianmin Hu, Zhengzhou (CN); Peikun Wan, Zhengzhou (CN); Jinzhe Hu, Zhengzhou (CN); Yuntao Bai, Zhengzhou (CN); Xiaoyong Liu, Zhengzhou (CN); Shumin Hu, Zhengzhou (CN)

( * ) Notice: Subject to any disclaimer, the term of this patent is extended or adjusted under 35 U.S.C. 154(b) by 0 days.

(21) Appl. No.: 16/331,114

(22) PCT Filed: Oct. 30, 2017

(86) PCT No.: PCT/CN2017/108245
§ 371 (c)(1),
(2) Date: Mar. 6, 2019

(87) PCT Pub. No.: WO2018/145490
PCT Pub. Date: Aug. 16, 2018

(65) Prior Publication Data
US 2019/0232248 A1 Aug. 1, 2019

(30) Foreign Application Priority Data
Feb. 8, 2017 (CN) .......................... 2017 1 0069588

(51) Int. Cl.
*B01J 19/18* (2006.01)
*C05C 9/02* (2006.01)
*B01J 19/00* (2006.01)

(52) U.S. Cl.
CPC ....... *B01J 19/1862* (2013.01); *B01J 19/0013* (2013.01); *B01J 19/0066* (2013.01);
(Continued)

(58) Field of Classification Search
CPC B01J 19/1862; B01J 19/0066; B01J 19/0013; B01J 19/1881; B01J 2219/00083;
(Continued)

(56) References Cited

U.S. PATENT DOCUMENTS

| 2,472,362 A | * | 6/1949 | Barnebey | B01J 3/04 165/64 |
| 3,627,744 A | * | 12/1971 | Hopkins | B01J 19/0013 526/68 |

FOREIGN PATENT DOCUMENTS

CN 202277831 U * 6/2012 ............. B01J 19/18

* cited by examiner

*Primary Examiner* — Huy Tram Nguyen
(74) *Attorney, Agent, or Firm* — Che-Yang Chen; Law Offices of Scott Warmuth

(57) ABSTRACT

A continuous chemical reactor may include a primary reaction unit and at least one secondary reaction unit. The primary reaction unit has a stirring device and a first temperature regulating device, and a feed inlet provided at an upper portion thereof. The secondary reaction unit is sleeved outside the primary reaction unit, and a reaction chamber is formed therebetween. By adding reaction materials to the primary reaction unit via the feed inlet and adjusting the temperature of the reaction materials by the first temperature regulating device, the reacted materials enter the reaction chamber, and the heat generated in the reaction chamber can be used to adjust the temperature of the materials in the primary reaction unit to more effectively use the heat, and the product after reaction can be discharged from a discharge hole at the lower end of the secondary reaction unit, thereby achieving continuous production.

10 Claims, 4 Drawing Sheets

(52) U.S. Cl.
CPC ............ *B01J 19/1881* (2013.01); *C05C 9/02*
(2013.01); *B01J 2219/00033* (2013.01); *B01J 2219/00083* (2013.01)

(58) Field of Classification Search
CPC .... B01J 2219/00033; B01J 2219/00081; B01J 2219/185; B01J 19/0053; C05C 9/02
USPC ........................................................ 422/600
See application file for complete search history.

CONTINUOUS CHEMICAL REACTOR

FIELD OF THE INVENTION

The present invention relates to a continuous chemical reactor, which belongs to the field of chemical reaction devices.

BACKGROUND OF THE INVENTION

Some chemical reactions require a pre-treatment for temperature adjustment in an early stage. When the raw materials start to react, heat can be generated, or heat needs to be supplied. Typical chemical reactions are implemented in a reactor in a batch manner. At the beginning of the reaction, the temperature of reaction materials needs to be adjusted, that is, the materials need to be heated or cooled down to meet the reaction conditions. After the reaction is started, it is necessary to continuously lower the temperature for an exothermic reaction, and continuously increase the temperature for an endothermic reaction, so that the materials in the reactor can maintain an optimal reaction temperature. The temperature adjustment process requires energy. When the temperature of the reaction has to be lowered, cooling water or other coolants may have to be used, and the cooling process will cause waste and loss of heat generated by the reaction process, which is not in line with the energy conservation and environmental protection expectation of modern society.

Moreover, ordinary reactors are used for batch production, that is, only when a batch of raw materials are reacted, the next batch of raw materials can be fed for reaction, resulting in a slow reaction rate and a low production efficiency. Therefore, there remains a need for a new and improved chemical reactor to overcome the problems such as ineffective use of heats released by the chemical reaction and low production efficiency stated above.

SUMMARY OF THE INVENTION

In one aspect, the present invention provides a continuous chemical reactor that comprises a primary reaction unit, a first secondary reaction unit and a second secondary reaction unit, wherein the primary reaction unit has a stirring device and a first temperature regulating device, and a feed inlet provided at the upper end. The secondary reaction unit is sleeved outside the primary reaction unit, and a reaction chamber is formed therebetween. The upper side wall of the primary reaction unit is provided with an overflow hole connected to the reaction chamber; the lower portion of the primary reaction unit and the first secondary reaction unit and the second secondary reaction unit are provided with drain outlets connected to the outside of the second secondary reaction unit; the lower portion of the secondary reaction unit is provided with a discharge hole.

In one embodiment, a manhole is provide at the upper end of the first and second secondary reaction units and the lower portion at one side of the first and second secondary reaction units is provided with an external circulating outlet connected to the outer portion of the second secondary reaction unit, and the upper portion at another side of the first secondary reaction unit and second secondary reaction unit is provided with an external circulating inlet connected to the outer portion of the outermost secondary reaction unit. The corresponding external circulating outlet and the external circulating inlet on the secondary reaction unit are connected by a pipeline, and the pipeline is provided with a circulating pump.

In another embodiment, a support structure is connected between the outside of the primary reaction unit and the inside of the secondary reaction unit or between the secondary reaction units. The support structure may be a support rod or a support frame. In one embodiment, the primary reaction unit, secondary reaction unit and support rod or support frame are all made of heat conductive materials suitable for the reaction materials to ensure the stability of the entire reactor and the stable reaction process.

DETAILED DESCRIPTION OF THE INVENTION

Figure 1:
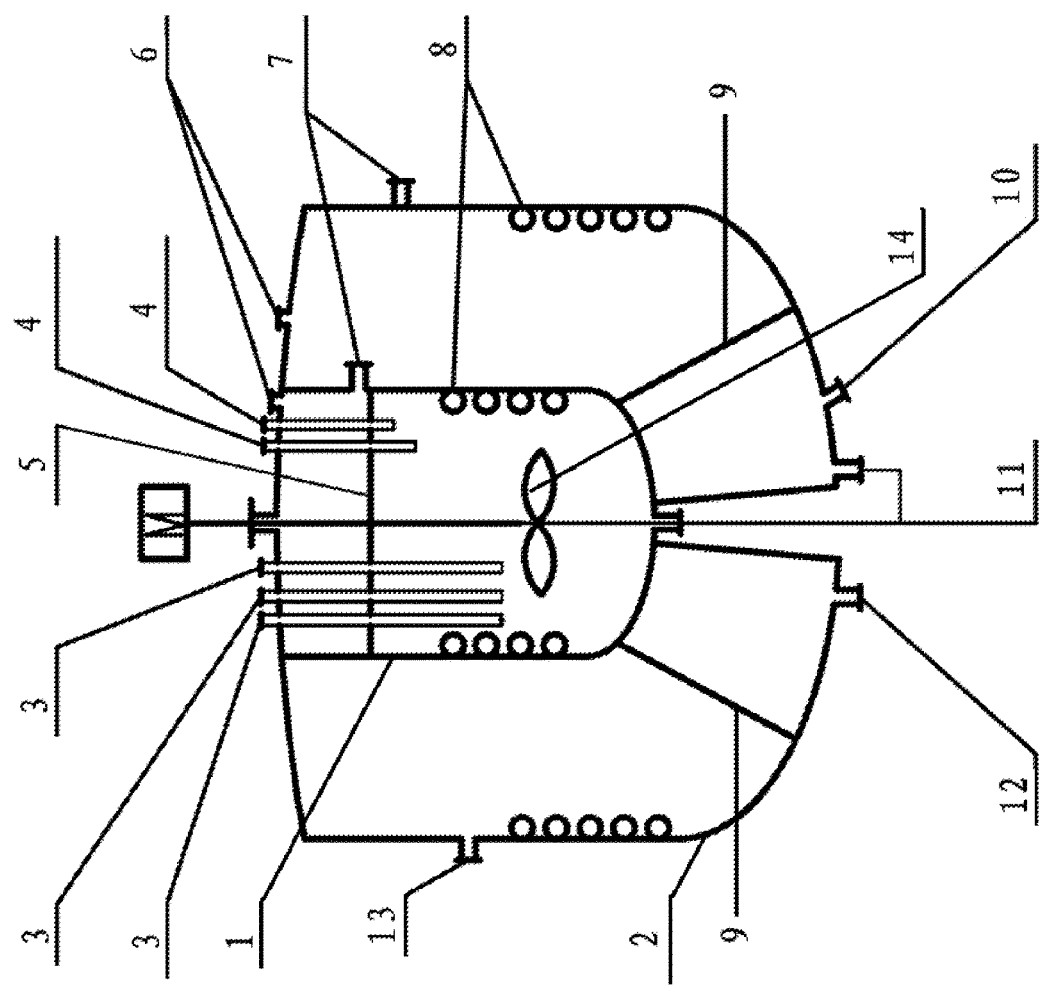
FIG. 1 is a schematic view of one embodiment of the continuous chemical reactor in the present invention.
Figure 2:
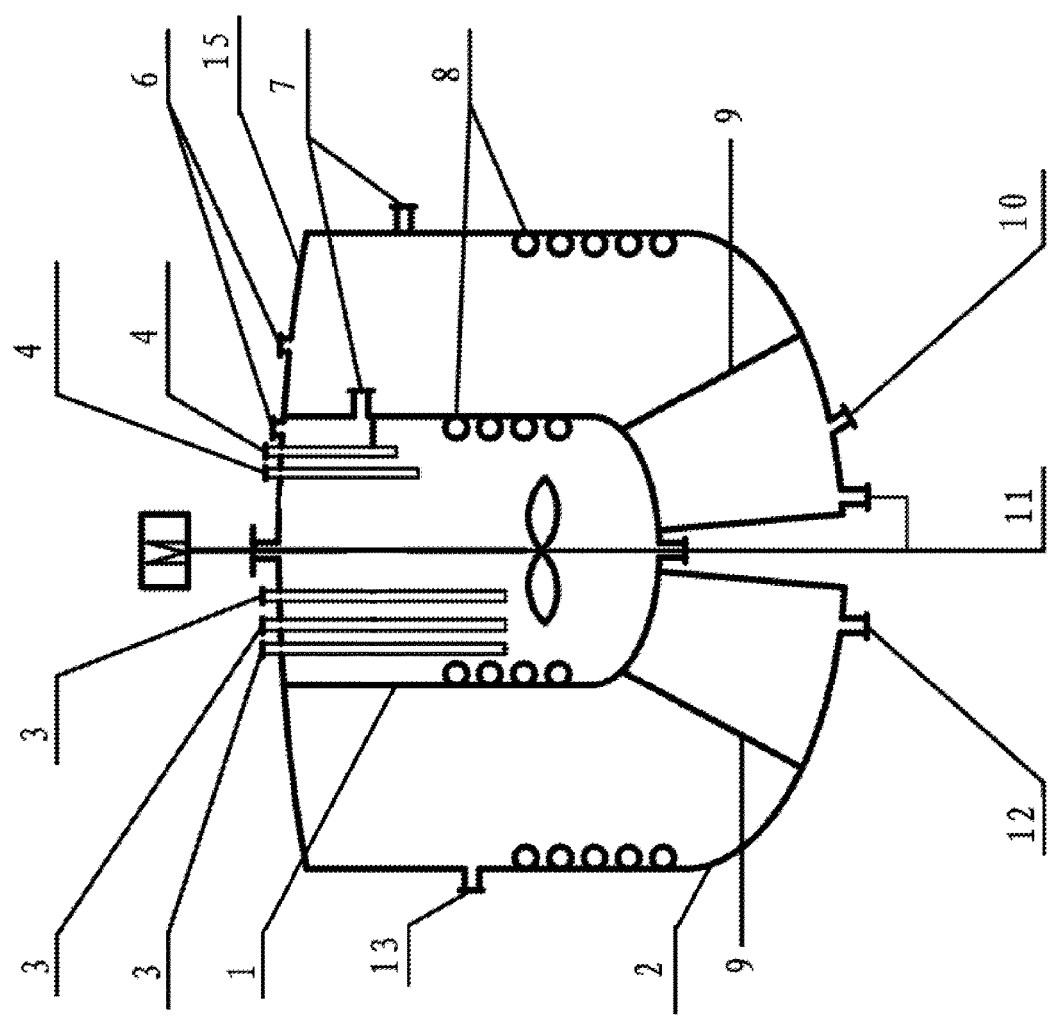
FIG. 2 is a schematic view of another embodiment of the continuous chemical reactor in the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In one aspect, referring to FIGS. 1 to 4, a continuous chemical reactor may include a primary reaction unit 1 and at least one secondary reaction unit 2, wherein the primary reaction unit having a stirring device 14 and a first temperature regulating device, and a feed inlet 3 provided at an upper end of the continuous reactor. The secondary reaction unit 2 is sleeved outside the primary reaction unit 1, and a reaction chamber is reserved therebetween. An upper side wall of the primary reaction unit 1 is provided with an overflow hole 7 connected to the reaction chamber; a drain outlet 11 is formed on a lower end of the primary reaction unit 1 and one side the secondary reaction unit 2; a discharge hole 12 is formed on the other side of the lower end of the secondary reaction unit 2.

The continuous chemical reactor further includes a manhole 6 located at an upper end of the primary reaction unit 1 and secondary reaction unit 2, which is used to check and clean residues in the primary reaction unit 1 and secondary reaction unit 2. Alternatively, an eye hole may be provided so as to observe, detect and adjust the reaction materials in the reaction chamber at any time.

In some specific embodiments, there are more than two secondary reaction units 2 arranged in a manner that one inside another, and a reaction chamber is reserved between two adjacent secondary reaction units 2. In one embodiment, the width of the reaction chamber between the primary reaction unit 1 and the secondary reaction unit 2 and between the two secondary reaction units 2 is greater than 0.5 m, and generally ranges from 1 m to 3 m, or different sizes can be designed according to the requirements for different reactions. In one embodiment, the discharge hole 12 may be disposed at the bottom of each secondary reaction unit 2. In another embodiment, it may be disposed only at the bottom of the outermost secondary reaction unit 2. It is noted that the discharge hole 12 at the bottom of each secondary reaction unit 2 is connected to the outermost secondary reaction unit 2.

Figure 3:
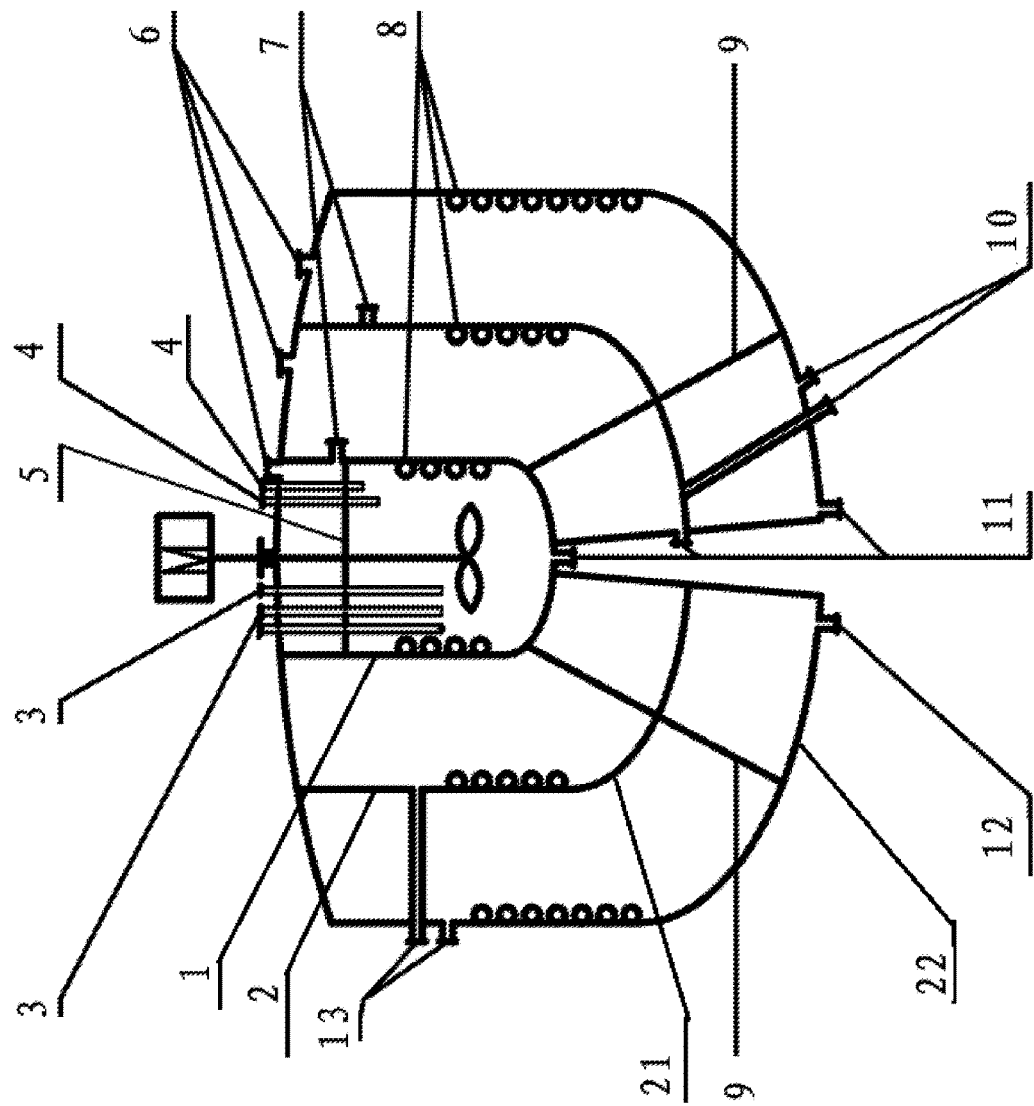
FIG. 3 is a schematic view of a further embodiment of the continuous chemical reactor in the present invention.
Figure 4:
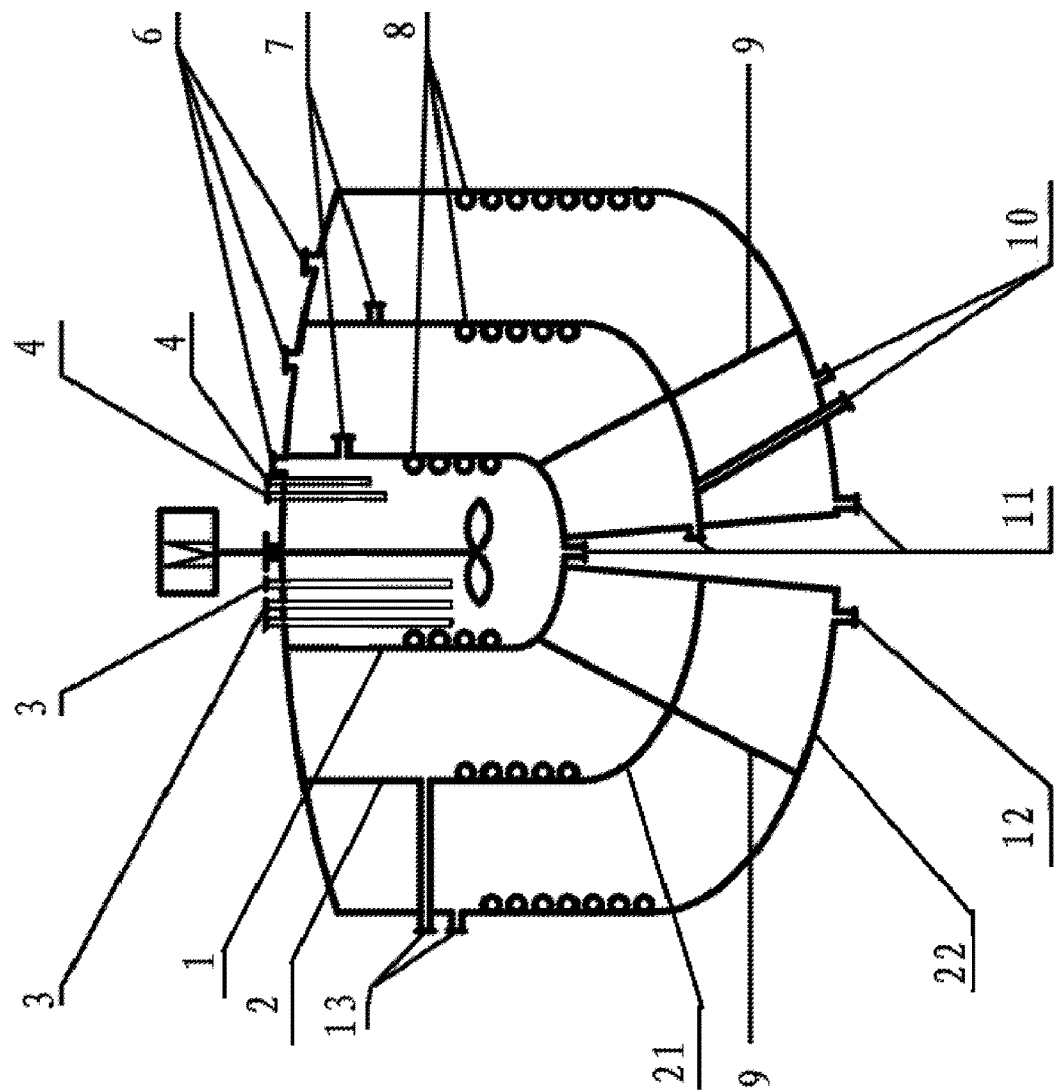
FIG. 4 is a schematic view of an alternative embodiment of the continuous chemical reactor in the present invention.

As shown in FIGS. 3 and 4, there are two secondary reaction units 2 arranged in a manner that one inside another, and a reaction chamber is formed therebetween. A cover 15 is provided on an upper portion of the primary reaction unit 1 and the secondary reaction unit 2, and the feed inlet 3 is disposed on the cover 15. It is noted that there may be one or more feed inlets 3 and test ports 4 on the cover 15. When the cover 15 at the top of the primary reaction unit 1 and the secondary reaction unit 2 is opened, quick feeding or cleaning of the continuous reactor in the present invention can be achieved.

In some embodiments, a second temperature regulating device is provided in the secondary reaction unit 2. Preferably, both the first temperature regulating device and the second temperature regulating device are coil temperature regulators 8. The coil of the coil temperature regulator 8 can be better placed on the inner wall of the primary reaction unit 1 and the secondary reaction unit 2 to achieve uniform temperature adjustment of the reaction materials. In an exemplary embodiment, both the primary reaction unit 1 and the secondary reaction unit 2 are cylindrical, with two ends exposed, and the bottom end is sealed or connected integrally by a convex arc-shaped bottom wall.

In a further embodiment, the lower portion of one side of the secondary reaction unit 2 is provided with an external circulating outlet 10 connected to the outer portion of the outermost secondary reaction unit 2, and the upper portion of the other side of the secondary reaction unit 2 is provided with an external circulating inlet 13 connected to the outside of the outermost secondary reaction unit 2. The corresponding external circulating outlet 10 and the external circulating inlet 13 on the secondary reaction unit 2 are connected by a pipeline, and the pipeline is provided with a circulating pump. It is noted that the materials inside the reaction chamber can be mixed uniformly through the external circulating pump to speed up the reaction process.

In another embodiment, a support structure is connected between the outside of the primary reaction unit 1 and the inside of the secondary reaction unit 2 or between the secondary reaction units 2. The support structure may be a support rod 9 or a support frame. In one embodiment, the primary reaction unit 1, secondary reaction unit 2 and support rod 9 or support frame are all made of heat conductive materials suitable for the reaction materials to ensure the stability of the entire reactor and the stable reaction process.

As shown in FIGS. 1 and 3, in a specific embodiment, a filter screen 5 is arranged in the primary reaction unit 1 below the overflow port 7 and above the reaction chamber. The filter screen structure can prevent large unreacted solid particles from entering the next reaction chamber, ensuring that the reaction process proceeds efficiently. In one embodiment, the pore size of the filter screen can be 0.5 mm to 1.5 mm, or it can be other sizes according to the reaction requirements.

In summary, the present invention provides a continuous chemical reactor that comprises a primary reaction unit 1, a first secondary reaction unit 2 and a second secondary reaction unit 2', wherein the primary reaction unit 1 has a stirring device and a first temperature regulating device, and a feed inlet provided at the upper end. The secondary reaction unit 2 is sleeved outside the primary reaction unit 1, and a reaction chamber is formed therebetween. The upper side wall of the primary reaction unit 1 is provided with an overflow hole connected to the reaction chamber; the lower portion of the primary reaction unit 1 and the first secondary reaction unit 2 and the second secondary reaction unit 2' are provided with drain outlets 11 connected to the outside of the second secondary reaction unit 2; the lower portion of the secondary reaction unit 2 is provided with a discharge hole 12. A manhole is provide at the upper end of the first and second secondary reaction units and the lower portion at one side of the first and second secondary reaction units is provided with an external circulating outlet connected to the outer portion of the second secondary reaction unit 2', and the upper portion at another side of the first secondary reaction unit 2 and second secondary reaction unit 2' is provided with an external circulating inlet connected to the outer portion of the outermost secondary reaction unit 2. The corresponding external circulating outlet and the external circulating inlet on the secondary reaction unit are connected by a pipeline, and the pipeline is provided with a circulating pump.

For example, the reaction of urea and formaldehyde is carried out by using the continuous chemical reactor in the present invention. The feed inlet includes a urea feed inlet, a formaldehyde feed inlet and a catalyst feed inlet; and a temperature sensor and a pH meter are disposed in the primary reaction unit 1 and the reaction chamber.

When the granular urea and 37% formaldehyde solution is at a molar ratio of 2:1, for production of one ton of polyurea-formaldehyde fertilizer containing 40% of slow-release nitrogen, 10-15 kg of standard coals can be saved depending on different ambient temperature. If the production can produce 100,000 tons of polyurea-formaldehyde fertilizer per year, 1,000 tons to 1,500 tons of standard coals can be saved.

The investment of equipment and plant for the production of more than 100,000 tons of products for the traditional method is 3 to 4 times more of the investment of the continuous chemical reactor in the present invention. Also, the labor cost of the former is 4 to 5 times more of that of the continuous chemical reactor in the present invention, and the production efficiency can be improved by more than 70%.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. A continuous chemical reactor comprising a primary reaction unit and at least one secondary reaction unit, wherein the primary reaction unit has a stirring device, a first temperature regulating device, and a feed inlet provided at an upper portion thereof; the secondary reaction unit is sleeved outside the primary reaction unit, and a reaction chamber is formed therebetween, wherein an overflow hole connected to the reaction chamber is formed at an upper side wall of the primary reaction unit; a drain outlet is disposed at lower portions of each of the primary reaction unit and the secondary reaction unit; and a discharge hole is formed at the lower portion of the secondary reaction unit.

2. The continuous chemical reactor of claim 1, wherein more than two secondary reaction units arranged in a manner that one sleeved outside another, and a reaction chamber is formed between two adjacent secondary reaction units.

3. The continuous chemical reactor of claim 1, wherein a cover is disposed at upper portions of the primary reaction unit and the secondary reaction units, and the feed inlet is disposed on the cover.

4. The continuous chemical reactor according to claim 1, wherein a second temperature regulating device is disposed in the secondary reaction unit.

5. The continuous chemical reactor according to claim 4, wherein both the first temperature regulating device and the second temperature regulating device are coil temperature regulators.

6. The continuous chemical reactor of claim 1, wherein an external circulating outlet is formed on one side of an outer portion the secondary reaction unit; an external circulating inlet is formed on the other side of the outer portion of the secondary reaction unit; a pipeline is used to connect the corresponding external circulating outlet and the external circulating inlet on the secondary reaction unit, and the pipeline is provided with a circulating pump.

7. The continuous chemical reactor of claim 1, wherein a support structure is connected between the outer portion of the primary reaction unit and the inner portion of the secondary reaction unit or between the two secondary reaction units.

8. The continuous chemical reactor of claim 1, wherein a filter screen is arranged in the primary reaction unit below the overflow port and above the reaction chamber.

9. The continuous chemical reactor of claim 1, wherein a test port is provided at the upper portion of the primary reaction unit and the secondary reaction unit.

10. The continuous chemical reactor of claim 1, wherein a manhole and an eye hole are provided at the upper portion of the primary reaction unit and at the upper portion of each secondary reaction unit.

* * * * *